(12) United States Patent
Hallitschke

(10) Patent No.: US 11,472,335 B2
(45) Date of Patent: Oct. 18, 2022

(54) OPTICAL DEVICE FOR MOTORCARS, LAMP FOR MOTORCARS AND AMBIENT LIGHTS

(71) Applicant: OLSA S.p.A., Rivoli-Cascine Vica To (IT)

(72) Inventor: Frank Hallitschke, Rivoli-Cascine Vica To (IT)

(73) Assignee: OLSA S.P.A., Rivoli To (IT)

( * ) Notice: Subject to any disclaimer, the term of this patent is extended or adjusted under 35 U.S.C. 154(b) by 0 days.

(21) Appl. No.: 17/405,435

(22) Filed: Aug. 18, 2021

(65) Prior Publication Data

US 2022/0134949 A1     May 5, 2022

(30) Foreign Application Priority Data

Nov. 2, 2020 (IT) .................. 102020000025987

(51) Int. Cl.
    *B60Q 3/74* (2017.01)
    *B60Q 3/20* (2017.01)
    *B60Q 3/60* (2017.01)
    *B60Q 3/233* (2017.01)
    *B60Q 3/78* (2017.01)
    (Continued)

(52) U.S. Cl.
CPC ............... *B60Q 3/745* (2017.02); *B60Q 3/20* (2017.02); *B60Q 3/60* (2017.02); *B60Q 3/217* (2017.02); *B60Q 3/233* (2017.02); *B60Q 3/258* (2017.02); *B60Q 3/267* (2017.02); *B60Q 3/54* (2017.02); *B60Q 3/57* (2017.02); *B60Q 3/78* (2017.02); *G02B 5/0252* (2013.01)

(58) Field of Classification Search
CPC ........ G02B 5/0252; B60Q 3/20; B60Q 3/217; B60Q 3/233; B60Q 3/258; B60Q 3/267; B60Q 3/54; B60Q 3/57; B60Q 3/60; B60Q 3/745; B60Q 3/78
See application file for complete search history.

(56) References Cited

U.S. PATENT DOCUMENTS 5,455,747 A    10/1995   Aoyama
5,571,277 A * 11/1996   Allred .................... F21V 5/002
                                                                 362/459
(Continued)

FOREIGN PATENT DOCUMENTS

CN        204227138 U * 3/2015
CN        204268149 U * 4/2015
(Continued)

*Primary Examiner* — Colin J Cattanach
(74) *Attorney, Agent, or Firm* — Dickinson Wright PLLC

(57) ABSTRACT

An optical device for a motorcar capable of generating three-dimensional optical and/or visual effects. The optical device comprises: a plurality of light sources, each one adapted to emit a light beam in a predetermined direction; a supporting element whereon the light sources are mechanically and electrically connected; and at least one optical module, which is adapted to be crossed by a light beam to emit light presenting a three-dimensional optical effect. The plurality of light sources include a plurality of micro-LEDs. The optical module include at least one layer of diffractive material. The optical module is arranged substantially parallel to the supporting element whereon the micro-LEDs lie. The optical module is arranged substantially perpendicular to the light beams emitted by the micro-LEDs.

14 Claims, 2 Drawing Sheets

(51) Int. Cl.
*B60Q 3/258* (2017.01)
*G02B 5/02* (2006.01)
*B60Q 3/267* (2017.01)
*B60Q 3/54* (2017.01)
*B60Q 3/57* (2017.01)
*B60Q 3/217* (2017.01)

(56) References Cited

U.S. PATENT DOCUMENTS

| | | | |
|---|---|---|---|
| 5,816,681 A * | 10/1998 | Tedesco | F21S 43/14 362/459 |
| 7,029,152 B1 | 4/2006 | Kuhl | |
| 9,299,278 B2 * | 3/2016 | Oh | G09F 13/20 |
| 10,006,600 B2 * | 6/2018 | Jo | G09F 19/14 |
| 2014/0043846 A1 * | 2/2014 | Yang | G02B 6/0035 362/606 |
| 2014/0043847 A1 * | 2/2014 | Yang | F21S 8/03 362/606 |
| 2014/0043856 A1 * | 2/2014 | Thompson | G02B 6/0035 362/613 |
| 2016/0320627 A1 * | 11/2016 | Chen | G02B 27/4277 |
| 2017/0131456 A1 * | 5/2017 | Morozov | G02B 6/0036 |
| 2017/0355321 A1 * | 12/2017 | Dellock | F21S 43/16 |
| 2018/0118101 A1 * | 5/2018 | Salter | B60Q 3/62 |
| 2018/0306400 A1 | 10/2018 | Muegge | |
| 2019/0149607 A1 * | 5/2019 | Shim | B60Q 3/16 307/10.1 |

FOREIGN PATENT DOCUMENTS

| | | | | |
|---|---|---|---|---|
| CN | 104791655 A | * | 7/2015 | |
| DE | 102012215165 A1 | | 2/2014 | |
| DE | 102014106602 A1 | * | 11/2015 | F21V 11/14 |
| DE | 102017108504 A1 | | 10/2018 | |
| EP | 2933550 A1 | | 10/2015 | |
| EP | 3211290 A1 | | 8/2017 | |
| EP | 3306179 A1 | | 4/2018 | |
| EP | 3385611 A1 | | 10/2018 | |
| EP | 3581434 A1 | * | 12/2019 | B60Q 3/217 |
| JP | 3076238 B2 | | 8/2000 | |
| JP | 2008233113 A | * | 10/2008 | G09F 13/16 |

* cited by examiner

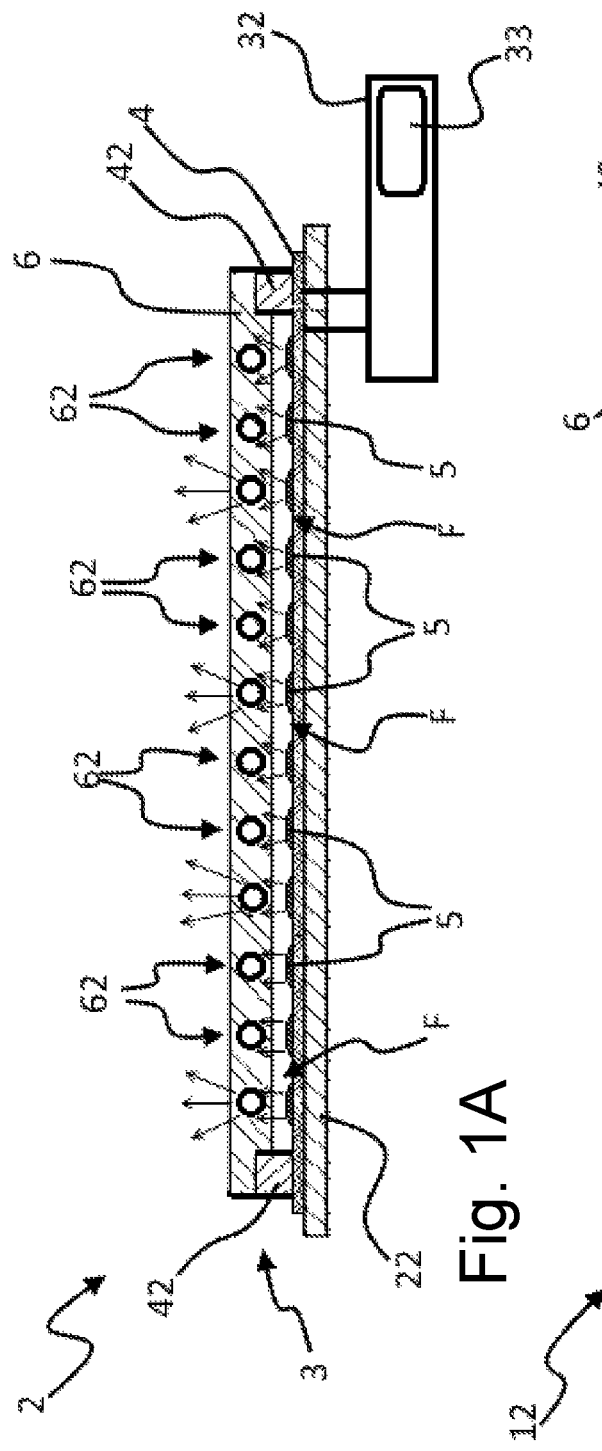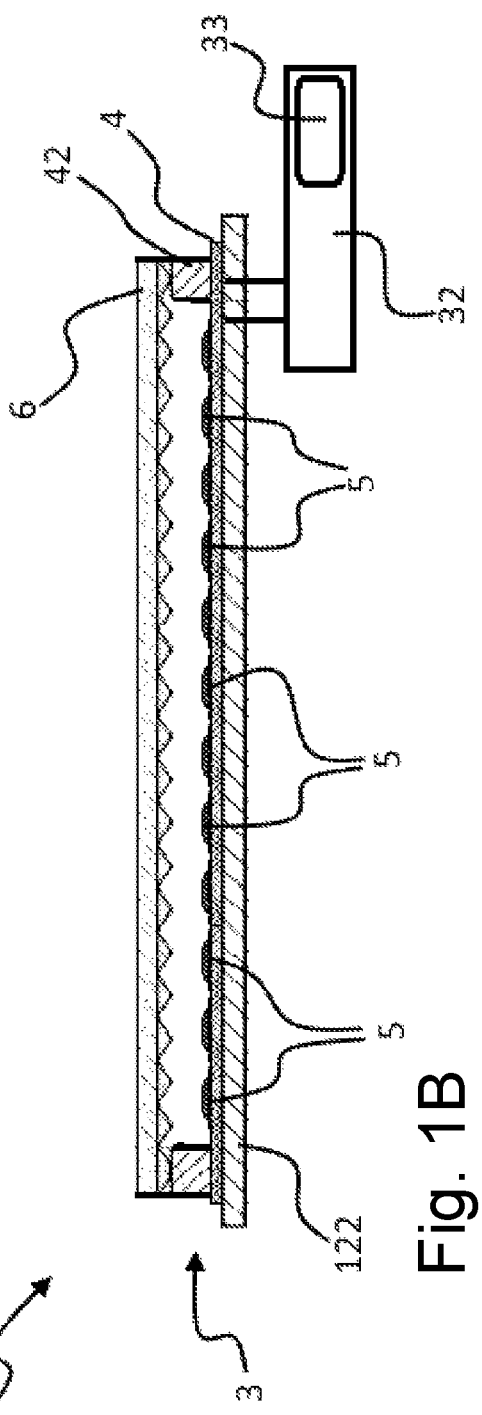

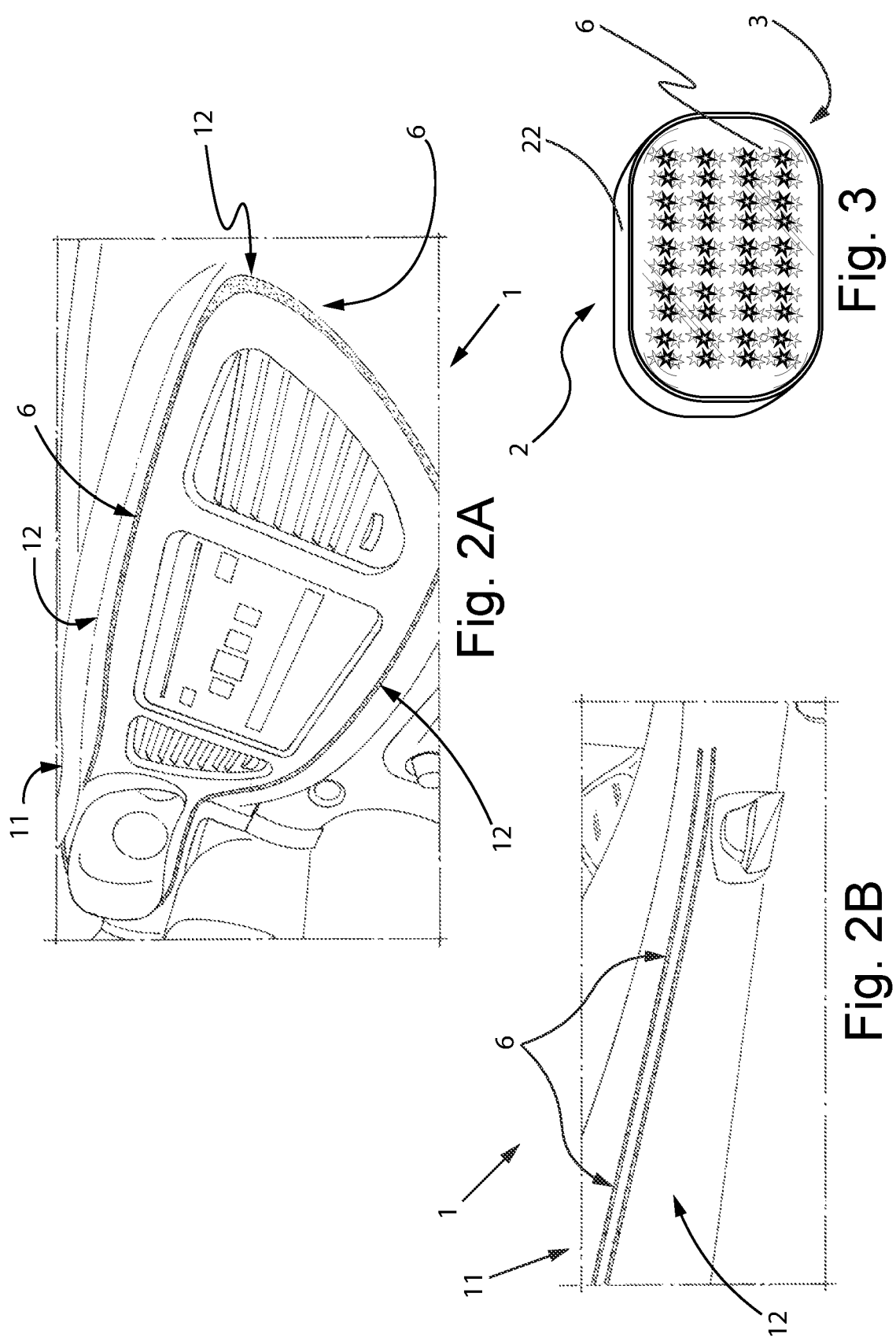

OPTICAL DEVICE FOR MOTORCARS, LAMP FOR MOTORCARS AND AMBIENT LIGHTS

CROSS-REFERENCE TO RELATED APPLICATION

This application claims the benefit of Italian (IT) Patent Application Serial No. 102020000025987, filed Nov. 2, 2020, which is incorporated herein by reference in its entirety.

FIELD

The present disclosure relates generally to lamps for motorcars. The present disclosure relates more specifically to an optical device for motorcars capable of emitting light and generating visual and/or optical effects such that the observer will perceive a three-dimensional effect.

BACKGROUND

This section provides background information related to optical devices to provide a better understanding of currently available configurations and adaptations of such optical devices. However, the information provided in this section is not necessarily considered to be prior art with respect to the inventive concepts associated with the present disclosure.

Optical systems and devices are known which comprise LED-type light sources capable of emitting light generating visual and/or optical effects presenting three-dimensional effects. Such solutions generally require a specific position of the LEDs with respect to the layers of diffractive material to ensure the desired visual effect. Moreover, conventional lighting devices do not include LEDs that face directly towards a layer of diffractive material, because the cone of light generated by LEDs is typically too wide to generate the desired visual effects.

Additionally, due to the wide light beam emitted by LEDs, it may be difficult or impossible to accurately control the activation of the visual effects on regions and/or subzones of an illuminated surface.

In conventional lighting devices, the LED light sources are positioned at the outer edges of the illuminated surface and, by exploiting the reflection principle, propagate the light inside a chamber, one surface of which may provide diffractive effects. Conventional lighting devices cannot be readily miniaturized because of the inherent dimensions of the individual LEDs. Moreover, any solution using optical elements for collimating the rays emitted by the LEDs would further increase the thickness of the resulting optical device.

Conventional lighting devices generally cannot activate diffractive effects in a selective and repeatable manner in different areas or zones of an illuminable surface without suffering from the drawback that other areas or zones of the same illuminable surface might be unintentionally activated. Furthermore, conventional lighting devices do not have sufficiently small thickness such that high ductility of the optical system is ensured, thus preventing their use in applications requiring such flexibility of the surfaces to create a structure capable of following curvilinear profiles.

Furthermore, conventional lighting devices may be designed such that the number of light sources is selected on the basis of the optical and/or visual effect to be provided, and that all the light sources must be activated simultaneously to be able to generate that optical and/or visual effect. Such devices do not allow control of individual light sources to change the optical and/or visual effect perceived by the user. In addition, because they cannot control the activation and/or deactivation of each light source, conventional lighting devices may not generate optical effects that can be perceived by the observer as an animation wherein movement of the generated three-dimensional optical effect is perceived. Also, conventional lighting devices may utilize traditional LEDs, and therefore the maximum possible LED density per surface unit is limited. Last but not least, conventional lighting devices may be designed based on a fixed point of observation, and therefore the optical effect perceived by the observer may not be varied.

SUMMARY

This section provides a general summary of some of the objects, advantages, aspects and features provided by the inventive concepts associated with the present disclosure. However, this section is not intended to be considered an exhaustive and comprehensive listing of all such objects, advantages, aspects and features of the present disclosure.

In one aspect, the present disclosure is directed to an optical device for a motorcar, such as a passenger car or truck. The optical device for a motorcar comprises: a plurality of light sources including a plurality of micro-LEDs, each light source of the plurality of light sources being adapted to emit a light beam in a predetermined direction. The optical device also comprises a supporting element whereon the light sources are mechanically and electrically connected. The optical device also comprises an optical module that includes at least one layer of diffractive material. The optical module is adapted to be crossed by the light beam to emit light presenting a three-dimensional optical effect. The optical module is arranged substantially parallel to the supporting element, and the optical module is arranged substantially perpendicular to the light beams emitted by the plurality of light sources.

Further areas of applicability will become apparent from the description provided herein. As noted, the description and any specific examples in this summary are intended for purposes of illustration only and are not intended to limit the scope of the present disclosure.

BRIEF DESCRIPTION OF THE DRAWINGS

Other advantages of the present embodiments will be readily appreciated, as the same becomes better understood by reference to the following detailed description and appended claims when considered in connection with the accompanying drawings, wherein:

FIG. 1A is a sectional view, relative to a vertical plane, showing an embodiment of the optical device according to the present disclosure;

FIG. 1B is a sectional view, relative to a vertical plane, showing another embodiment of the optical device according to the present disclosure;

FIG. 2A shows an ambient light for the cabin of a motor car in the form of a front panel, in accordance with one aspect of the present disclosure;

FIG. 2B shows shows a car door with ambient lights on an inner part thereof, including an optical device according to an aspect of the disclosure; and FIG. 3 shows a schematic front view of a lamp including an optical device according to an aspect of the disclosure.

DETAILED DESCRIPTION OF EXAMPLE EMBODIMENTS

The example embodiments will now be described more fully with reference to the accompanying drawings.

One or more example embodiments of lamps for motorcars, and optical devices for such lamps are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure provides an optical device for a motorcar, such as a passenger car or truck. More specifically, the present disclosure provides such an optical device capable of emitting light and generating visual and/or optical effects such that the observer will perceive the emitted light presenting a three-dimensional optical effect.

The present disclosure further relates to a lamp for a motorcar comprising an optical device capable of emitting light and generating visual and/or optical effects such that the observer will perceive emitted light presenting a three-dimensional optical effect.

In addition, the present disclosure relates to ambient lights for cabins of motorcars, comprising at least one optical device capable of emitting light and generating visual and/or optical effects such that the observer will perceive the emitted light presenting a three-dimensional optical effect.

The present disclosure aims at solving several technical problems with conventional lighting devices. The present disclosure provides an optical device that includes an optical module arranged substantially perpendicular to the light beams emitted by the light sources and which is adapted to emit light presenting a three-dimensional visual and/or optical effect.

FIGS. 1A and 1B are sectional views, relative to a vertical plane, of two possible embodiments of the optical device according to the present disclosure; in particular, FIG. 1A shows an optical device comprising a first possible embodiment of an optical module in the form of a layer of diffractive material associated with micro-LEDs;

FIG. 1B shows a second possible embodiment of an optical module in the form of a layer of diffractive material associated with the micro-LEDs.

FIGS. 2A and 2B show some possible embodiments of ambient lights for cabins of motorcars, comprising at least one portion having an optical device according to the present disclosure; in particular, FIG. 2A shows a front panel, e.g. a control panel, surrounded by ambient lights, wherein at least one portion comprises an optical device according to the present disclosure; FIG. 2B shows a car door provided with ambient lights on its inner part, at least one portion of which comprises an optical device according to the present disclosure.

FIG. 3 shows a schematized front view of one possible embodiment of a lamp comprising the optical device according to the present disclosure.

With reference to the above-mentioned figures, reference numeral 3 designates as a whole the optical device according to the present disclosure, whereas number reference 1 designates, as a whole, a motorcar. The optical device 3 according to the present disclosure may be adapted for application to motorcars 1.

The optical device 3 according to the present disclosure is capable of generating three-dimensional optical and/or visual effects. For the purposes of the present description, three-dimensional optical and/or visual effects are to be understood as an image generated by a merely optical effect, which is perceived by the observer's human eye as having three dimensions, in particular length, width and depth. More specifically, the optical and/or visual effects may define a light emission image that appears to have a certain depth or volume. Even more specifically, the three-dimensional optical and/or visual effects may also include holographic effects perceivable by the observer's eye.

The optical device 3 includes a plurality of light sources 5. Each light source 5 is adapted to emit a light beam "F" in a predetermined direction. The optical device 3 also includes a supporting element 4. The light sources 5 are mechanically and electrically connected on the supporting element 4. The optical device 3 also includes an optical module 6, which is adapted to be crossed by a light beam "F", thus emitting light presenting a three-dimensional optical and/or visual effect. In some embodiments, the plurality of light sources 5 consist of a plurality of micro-LEDs. However, the plurality of light sources 5 may include other types of illumination devices.

For the purposes of the present description, the micro-LEDs may include a plurality, e.g. an array or matrix, of light-emitting diode (LED) devices, such as red-green-blue (RGB) type LEDs, having a very high density per surface unit. For example, the micro-LEDs may be spaced apart by 3 mm at most from each other, wherein each LED device is physically and mechanically separable from the other LED devices in the array or matrix, and wherein the LEDs are arranged on the supporting element 4. The present disclosure makes it possible to obtain a very high density of light sources per surface unit.

In some embodiments, the optical module 6 includes at least one layer of diffractive material. More specifically, the optical module 6 may include only one layer of diffractive material.

For the purposes of the present description, the diffractive material is meant to be a material capable of deviating the trajectory of the light rays belonging to a light beam "F" by means of obstacles along the path of the light rays, and/or because of the optical characteristics of the medium being crossed by the light beam "F", thus generating a diffraction effect. Through such diffraction effect, it is possible to generate the three-dimensional optical and/or visual effect, even a holographic one.

Said optical module 6 is arranged substantially parallel to the supporting element 4 whereon the micro-LEDs 5 lie.

In some embodiments, the optical module 6 is arranged substantially perpendicular to light beams "F" emitted by the micro-LEDs 5. The present embodiment permits a considerable reduction in the overall thickness of the optical device because micro-LEDs 5 are used and the optical module 6 faces directly towards the micro-LEDs 5, since the optical module 6 is substantially perpendicular to light beams "F" emitted by the micro-LEDs 5. In fact, the micro-LEDs 5 generate a narrow light beam "F", in comparison with the light beam emitted by a common LED, wherein the narrow beam can be easily directed towards optical module 6.

The present disclosure also allows placing the optical device 3 on non-planar surfaces, e.g. on curved surfaces, since the optical device 3 can be adapted to the surface whereon it must be applied without losing its optical properties.

In one possible embodiment of the optical device 3, the micro-LEDs 5 face directly towards the layer of diffractive material of the optical module 6. Preferably, light beams "F" emitted by the micro-LEDs 5 are directed towards the layer of diffractive material of the optical module 6. Preferably, between the micro-LEDs 5 and optical module 6, in particular the layer of diffractive material of the optical module 6, there is only an air gap. In some embodiments, there may be no other optical elements between the micro-LEDs 5 and the optical module 6 for guiding the light emitted by the micro-LEDs 5 towards optical module 6.

In one possible embodiment of the optical device 3, the micro-LEDs 5 are arranged in spaced-out rows and/or columns. The micro-LEDs 5 may be arranged to form a matrix of light sources. The matrix may include straight rows and straight columns at a 90-degree angle to the straight rows. Alternatively, the micro-LEDs 5 in each row may be offset from micro-LEDs 5 in adjacent rows. The micro-LEDs 5 may be arranged in rows and/or columns that are spaced out by 3 mm at most. In some embodiments, the micro-LEDs 5 may be arranged along non-linear rows, such as curved paths.

In an example embodiment, the distance between two successive micro-LEDs, e.g. along a line, a row and/or a column, is approximately 2 mm. In an example embodiment, each micro-LED is made by using CPS technology. Such an embodiment permits the achievement of high optical performance.

The plurality of micro-LEDs 5 may have a sufficient density per surface unit to ensure an even illumination aspect through optical module 6 when all micro-LEDs 5 are on. By activating a sub-group of the micro-LEDs 5, i.e. fewer than the total number thereof, light beam "F" emitted by the active micro-LEDs 5 may, as they cross the optical module 6, generate at least one three-dimensional optical effect.

In one possible embodiment of the optical device 3, the layer of diffractive material of the optical module 6 is a foil or a film having diffractive, e.g. holographic, properties. In particular, the layer of diffractive material of the optical module 6 comprises, internally and/or on its surfaces, elements that allow creating the three-dimensional optical effect; therefore, the hologram and/or the holographic effect is comprised in the same layer of diffractive material of the optical module 6.

More in general, the optical module 6 may be transparent and/or coloured, depending on specific requirements.

In some embodiments, the layer of diffractive material of the optical module 6 defines zones or regions 62. At least one three-dimensional optical effect, e.g. a holographic effect, may develop in each zone or region 62. Such embodiments may permit creating different three-dimensional optical effects in a single layer of diffractive material of the optical module 6. Moreover, different three-dimensional optical effects may be associated with different zones or regions 62.

In some embodiments, the layer of diffractive material of the optical module 6 defines a plurality of zones or regions 62, wherein each zone or region 62 permits creating the optical effect associated with at least one, preferably only one, activated micro-LED, wherein such micro-LED emits a light beam "F" which is perpendicular to such zone or region 62. In the present embodiment, for each zone or region 62 there is at least one, even only one, micro-LED 5 forming, for example, a matrix of light sources.

In some embodiments, the supporting element 4 is flexible and can assume different conformations, e.g. different shapes. The present embodiment permits positioning the micro-LEDs 5 on non-planar surfaces without altering the optical effect that can be provided by optical device 3. Such an embodiment permits associating optical device 3 according to the present disclosure with different applications wherein it is not necessary that the surface is flat. The present embodiment permits following the shape of, for example, a lamp or a portion of the cabin of a motorcar.

Preferably, the layer of diffractive material of the optical module 6 is also designed to be flexible and to be able to assume different conformations. Alternatively, the supporting element may be made of rigid material, and any necessary curvature may be created during the manufacturing process, depending on the place where such optical device 3 will have to be positioned. The optical device 3 can also be applied onto curved surfaces, even having different curvatures along the same surface.

In some embodiments, the layer of diffractive material of the optical module 6 is attached to the supporting element 4. For example, the layer of diffractive material of the optical module 6 may be directly attached to the supporting element 4. The present embodiment makes it possible to provide the desired three-dimensional optical effect even when the optical device 3 is not placed on flat surfaces, ensuring uniform performance of the optical device 3 regardless of the surface whereon it is applied. In such an embodiment, advantageously, the micro-LEDs 5 may face directly towards the layer of diffractive material of the optical module 6, so that light beams "F" emitted by the micro-LEDs 5 will be directed towards the layer of diffractive material of the optical module 6. In such an embodiment, the micro-LEDs 5 remain substantially always at a same distance from the layer of diffractive material of the optical module 6, thus not altering the three-dimensional optical effect that can be provided by the optical device 3.

In some embodiments, the layer of diffractive material of the optical module 6 is attached to the supporting element 4 by means of spacers 42. The spacers 42 may hold the layer of diffractive material of the optical module 6 at a consistent and known distance from the supporting element 4.

The layer of diffractive material of the optical module 6 may include a film or a foil, and the optical device 3 may have a large surface. The optical device 3 may also include a supporting layer, which may be transparent, and which may be adapted to provide rigidity to the layer of diffractive material of the optical module 6, for keeping a same distance between the layer of diffractive material of the optical module 6 and the micro-LEDs 5 along an entire surface of the optical device 3.

The optical device 3 according to the present disclosure may have any shape, e.g. square, rectangular, circular, strip-like, etc., while keeping its own optical characteristics unchanged. Likewise, the area of the surface occupied by optical device 3 may vary as necessary depending on the final applications.

In some embodiments, the optical device 3 may include a control unit 32. The control unit 32 may be adapted to appropriately control, e.g. activate, deactivate and/or change the colour of, every single micro-LED 5 comprised in optical device 3. In particular, the control unit 32 may be capable of controlling each individual micro-LED 5 independently of and separately from other micro-LEDs 5. Such a control unit 32 may permit generating a plurality of possible three-dimensional optical effects perceivable by the observer, even different from one another, by changing the activated micro-LEDs 5, e.g. in the embodiment wherein the optical module 6 is a layer of diffractive material comprising zones or regions 62, each one adapted to generate one three-dimensional optical effect.

The micro-LEDs 5 may be micro-LEDs that can be individually controlled in an independent manner, being addressable micro-LEDs, particularly when arranged in formation, e.g. in matrix form. In one possible embodiment, the control unit 32 can control either a single micro-LED or groups of coherent micro-LEDs, e.g. LEDs arranged along a same direction or within a volume at a certain distance from each other, etc.

In some embodiments, the control unit 32 comprises a memory unit 33. The memory unit 33 may store one or more sequences of instructions for suitably and successively activating one or more micro-LEDs 5 for the purpose of generating one or more animations visible to the observer. Such a memory unit 33 may enable the optical device 3 to provide an animation, variable over time, of three-dimensional optical effects perceivable by the user, by suitably activating one or more micro-LEDs 5 in the desired sequence. For the purposes of the present description, the term "animation" refers to a variation over time of the optical effect perceived by the user without changing the user's point of observation. Such an animation may be perceived as a movement of the visible image, a change in colour and/or luminous intensity, etc.

By appropriately activating a given number of micro-LEDs 5, smaller than the total number thereof, the user observing the optical device 3 may perceive a first predetermined three-dimensional optical effect. By increasing the number of active micro-LEDs 5, such number being however still smaller than the total number thereof, the user observing the optical device 3 may perceive a second predetermined three-dimensional optical effect, such second three-dimensional optical effect being different from the first three-dimensional optical effect. Such second three-dimensional optical effect may correspond to a combination of overlapping and/or mutually close three-dimensional optical effects.

If the number of active micro-LEDs 5 is further increased, e.g. up to a predefined threshold, e.g. close to the total number thereof, the user observing the optical device 3 may perceive the emission of uniform light, being no longer able to discern a three-dimensional optical effect. Such a visual effect can be provided, for example, through excessive overlapping of a large number of three-dimensional optical effects, resulting in an overloaded optical effect, so that the observer will no longer be able to discern the individual optical effects.

More in general, when some, but not all, micro-LEDs 5 are activated, at least one three-dimensional effect, e.g. an outline or a pattern, will be visible, even when the same pattern is repeated multiple times in space; conversely, when the number of active micro-LEDs is progressively increased, the three-dimensional optical effect will gradually disappear, until homogeneous illumination is perceived by the observer.

By suitably activating micro-LEDs 5 in succession along a specific direction, e.g. along a row and/or a column of a matrix structure, it may be possible to provide a perception of motion of the three-dimensional optical effect, e.g. a wave, waterfall and/or rain effect.

More in general, the optical device 3 of the present disclosure may provide a plurality of three-dimensional optical effects, perceivable by the user, by appropriately activating the micro-LEDs 5 according to a suitable sequence.

In one possible embodiment, the optical module 6, and in particular the layer of diffractive material, is designed such that the activation of a single micro-LED 5 will generate a first three-dimensional optical effect; whereas when two or more successive micro-LEDs 5 are activated, e.g. along the same row and/or the same column of a matrix of micro-LEDs 5, a second three-dimensional optical effect will be generated, different from the first optical effect. For example, a composite three-dimensional optical effect, different from every single three-dimensional optical effect that can be generated by each individual micro-LED 5.

FIG. 1A shows a sectional view of one possible embodiment of the optical device 3, according to the present disclosure. Such embodiment shows a first possible embodiment of the optical module 6, implemented as a layer of diffractive material of the optical module 6 associated with the micro-LEDs 5. The present embodiment is capable of generating a three-dimensional optical effect that will depend on the arrangement and density of the obstacles that are present in optical module 6, in particular within the layer of diffractive material of the optical module 6, which can deviate the rays of light beam "F" emitted by micro-LEDs 5.

The sectional drawing shows a plurality of micro-LEDs 5 arranged along a line. The micro-LEDs lie on a supporting element 4, which in turn is secured to a supporting structure 22, e.g. a structure of a lamp 2 or a supporting structure for ambient lights inside the cabin of a motorcar 1.

The optical module 6, in the form of a layer of diffractive material, is positioned at a predetermined distance from supporting element 4, and hence from micro-LEDs 5, by means of spacers 42 that are connected to supporting element 4. Between the layer of diffractive material of the optical module 6 and the micro-LEDs 5 there is air. In the illustrated embodiment, micro-LEDs 5 are electrically connected to and controlled by control unit 32. The control unit 32 comprises a memory unit 33 storing one or more sequences of instructions, which can be understood by control unit 32, for suitably and successively activating one or more micro-LEDs 5, for the purpose of generating one or more three-dimensional optical effects and/or animations visible to the observer.

In the illustrated embodiment, the layer of diffractive material of the optical module 6 comprises a plurality of zones or regions 62. At least one micro-LED 5 is associated with each zone or region 62. The layer of diffractive material of the optical module 6 may include a holographic film or foil.

FIG. 1B shows a sectional view of another embodiment of the optical device 3, according to the present disclosure. In this embodiment, a second embodiment of the optical module 6 is illustrated, which is implemented as a layer of diffractive material associated with the micro-LEDs 5.

The present embodiment is capable of generating at least one three-dimensional optical effect through suitable corrugations provided on the face of the layer of diffractive material of the optical module 6 opposite micro-LEDs 5. Such corrugations are, for example, inclined surfaces whereon the light rays emitted by micro-LEDs 5 are reflected and/or refracted as they are conducted within optical module 6, according to Fresnel's law. Such corrugations may vary in shape, size and density in the various zones or regions of the layer of diffractive material of the optical module 6, so as to create different optical and/or visual effects.

In the illustrated embodiment, micro-LEDs 5 lie on a supporting element 4, which in turn is secured to a supporting structure 122, e.g. a structure for ambient lights 12 inside a cabin 11 of a motorcar 1, or a supporting structure of a lamp.

Optical module 6 is positioned at a predetermined distance from supporting element 4, and hence from micro-LEDs 5, by means of spacers 42 connected to supporting element 4. The micro-LEDs 5 are electrically connected to and controlled by control unit 32. The control unit 32 comprises a memory unit 33 storing one or more sequences of instructions, which can be understood by control unit 32, for suitably and successively activating one or more micro-LEDs 5, for the purpose of generating one or more three-dimensional optical effects and/or animations visible to the observer.

The optical device 3 of present disclosure may be particularly suitable for use with a lamp 2. Preferably, the lamp 2 may be adapted to be applied to a motorcar 1. Such a lamp 2 includes at least one supporting structure 22 to which light sources are connected for providing the peculiar functions of the lamp 2. For the purposes of the present description, the term "function" refers to the emission of light of a suitable type-dependent colour, with photometric specifications dictated by one or more law requirements, such as, for example, brake lights, parking lights, direction indicators, reverse lights, rear fog lights, front fog lights, etc.

The lamp 2 of the present disclosure comprises at least one optical device 3. For example, the optical device 3 may be connected to supporting structure 22 of lamp 2 through supporting element 4 whereon the micro-LEDs 5 lie. Facing the supporting element 4, and hence the micro-LEDs 5, there is optical module 6, which is, for example, a layer of diffractive material.

One possible embodiment of the lamp 2 for a motorcar 1 comprises a plurality of micro-LEDs 5 mounted on a supporting surface or supporting element 4, with each of the micro-LEDs 5 being independently controllable. The lamp 2 also comprises an optical module 6, e.g. a holographic film or foil, through which the plurality of micro-LEDs 5 project light. The plurality of micro-LEDs 5 has a density per surface unit which is sufficient to create a uniform illumination aspect through optical module 6, when all micro-LEDs 5 are on, preferably being able to perform one or more of the functions associated with the lamp 2. In the same embodiment, when only some micro-LEDs 5 of the plurality of micro-LEDs 5, e.g. a sub-group smaller than the total number of micro-LEDs 5, are activated, light beams "F" emitted by the active micro-LEDs 5 will generate, as they cross the optical module 6, at least one three-dimensional optical effect, and therefore the observer will be able to see one or more holograms produced by means of the optical module 6, e.g. a holographic film or foil.

According to an aspect of the disclosure, one region of the lamp 2 can both perform a particular function, e.g. brake light or parking light, whenever necessary, and generate three-dimensional optical effects.

FIG. 3 shows a front view of one possible embodiment of a lamp 2 comprising at least one optical device 3 according to the present disclosure. In this figure, which is merely illustrative and non-limiting, one can see a lamp 2 comprising a supporting structure 22 to which optical device 3 according to the present disclosure is connected. The optical device 3 comprises an optical module, in particular a layer of diffractive material, which defines zones or regions, each one of which can produce at least one three-dimensional optical effect; in particular, each zone or region can generate a star-shaped three-dimensional optical effect.

In the illustrated embodiment, only a limited number of micro-LEDs 5, of the whole plurality, are on, and therefore the different three-dimensional optical effects covering the entire illuminated surface can be easily identified. If all micro-LEDs 5 were on, the observer would only see an evenly illuminated surface, without being able to discern the various three-dimensional optical effects.

Other embodiments of the lamp 2 and/or the optical device 3, in particular as concerns the three-dimensional optical effects that can be provided by the optical device 3, and/or the shape of lamp 2 itself and the functions thereof, should be considered to fall within the protection scope of the present disclosure.

Moreover, the optical device 3 of the present disclosure may be associated with ambient lights 12 for cabins 11 of motorcars 1. For example, the optical device 3 may be adapted to be associated with ambient lights 12 that include a supporting structure 122 to which a plurality of light sources are connected. The supporting structure 122 may be adapted to extend and follow at least a part or portion of the profile of a cabin 11 of motorcar 1, e.g. the control panel, the instrument panel and/or the doors.

More in general, the ambient lights 12 can execute light animations which are useful for the driver and/or the passengers. The animations executed by ambient lights 12 in a cabin 11 of a motorcar 1 may be of a conventional type known to a person skilled in the art and will not be described herein any further.

FIG. 2A shows one possible embodiment of ambient lights 12 for a motorcar 1, in particular a front panel, e.g. a control panel and an instrument panel in a cabin 11 of a motorcar 1, wherein the control panel and the instrument panel are surrounded by a system of ambient lights 12 according to the present disclosure.

In the illustrated embodiment, a cabin 11 is shown which comprises the control panel and instrument panel surrounded by ambient lights 12. In some portions of ambient lights 12 there are one or more optical devices 3 according to the present disclosure. In the illustrated embodiment, two regions or locations of ambient lights 12 are indicated where there is an optical module 6, e.g. a layer of diffractive material of the optical module 6, capable of generating three-dimensional optical effects. Such three-dimensional optical effects are adapted to provide feedback to the driver and/or the passenger.

FIG. 2B shows another possible embodiment of ambient lights 12 for cabins 11 of motorcars 1, in particular a door having, in its internal part, a plurality of ambient lights 12.

In the illustrated embodiment, ambient lights 12 are present in the portion of the door of motorcar 1 which faces towards cabin 11. In the illustrated embodiment, two regions or locations of ambient lights 12 are indicated where there is an optical module 6, e.g. a layer of diffractive material of the optical module 6 capable of generating three-dimensional optical effects. Such three-dimensional optical effects are adapted to provide feedback to the driver and/or the passenger.

The present disclosure makes it possible to simplify the positioning of the light sources, in particular micro-LEDs 5, with respect to optical module 6, thus permitting the creation of any desired three-dimensional optical effect. The present disclosure allows activating, as required and in a well-defined manner, single three-dimensional optical effects without any contamination from optical effects generated by neighbouring or nearby zones or regions. The present disclosure makes it possible to evenly illuminate a surface by activating most, e.g. all, of the micro-LEDs, while three-dimensional optical effects and/or animations can be provided by activating only an adequate number thereof and/or according to a suitable sequence.

The present disclosure makes it possible to activate three-dimensional optical effects even in sub-zones or sub-regions of the illuminated surface, or even compositions of three-dimensional optical effects. The present disclosure makes it possible to miniaturize optical device 3 while still preserving a high capability of producing three-dimensional optical effects. In particular, the present solution allows reducing the thickness of the optical device 3. The present disclosure makes it possible to apply the optical device 3 on planar surfaces or on non-planar surfaces, e.g. following the profile of the interior compartment of a motor car or the profile of a lamp. The present disclosure makes it possible to provide refined three-dimensional optical effects and/or animations, such as, for example, rain effects, e.g. star rain, filling effects, e.g. puzzle effects, and wave or waterfall effects. The present disclosure provides for refined three-dimensional effects and/or animations as well as homogeneous illumination of a surface.

Other embodiments which have not been expressly described herein, but which can be easily inferred by a person skilled in the art in the light of the present patent application, should be considered to fall within the scope of the present disclosure.

REFERENCE NUMERALS

Motorcar 1
Cabin 11
Ambient lights 12
Supporting structure 122
Lamp 2
Supporting structure 22
Optical device 3
Control unit 32
Memory unit 33
Supporting element 4
Spacers 42
Light source 5
Optical module 6
Zone or region 62
Light beam F The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An optical device for a motorcar, comprising: a plurality of light sources including a plurality of micro-LEDs, each light source of the plurality of light sources being adapted to emit a light beam in a predetermined direction; a supporting element whereon the light sources are mechanically and electrically connected; an optical module including at least one layer of diffractive material, the optical module adapted to be crossed by the light beam to emit light presenting a three-dimensional optical effect; and a control unit adapted to control every micro-LED of said plurality of micro-LEDs in the optical device; wherein the optical module is substantially parallel to the supporting element, and substantially perpendicular to the light beams emitted by the plurality of light sources, wherein, when a sub-group of said micro-LEDs less than a predetermined threshold are activated, the light beams emitted by said active micro-LEDs will generate at least one three-dimensional optical effect; wherein said plurality of micro-LEDs have a density per unit area which is sufficient to create a uniform illumination through the optical module when a number of the micro- LEDs greater than the predetermined threshold are on; and wherein the at least one three-dimensional optical effect is not discernable when the uniform illumination is created; and wherein there are no optical elements located between said plurality of micro-LEDs and said optical module.

2. The optical device according to claim 1, wherein the micro-LEDs are spaced-apart from one another and arranged in one of rows or columns;
    wherein the three-dimensional optical effect is one of a plurality of three-dimensional optical effects;
    wherein the layer of diffractive material defines a plurality of zones or regions; and
    wherein each zone or region of the plurality of zones or regions presents at least one three-dimensional optical effect of the plurality of three-dimensional optical effects.

3. The optical device according to claim 2, wherein:
said micro-LEDs are arranged to form a matrix; and
    wherein each zone or region of the plurality of zones or regions is aligned with at least one of said micro-LEDs and is configured to emit light presenting the at least one three-dimensional optical effect in response to emission of a light beam perpendicularly thereto by the at least one of said micro-LEDs aligned therewith.

4. The optical device according to claim 1, wherein the supporting element is flexible and capable of assuming different conformations.

5. The optical device according to claim 1, wherein the layer of diffractive material is attached to the supporting element, and held thereto at a consistent and known distance by a plurality of spacers.

6. The optical device according to claim 1, wherein the micro-LEDs each face directly towards the layer of diffractive material.

7. The optical device according to claim 1, wherein the light beams emitted by the micro-LEDs are directed towards the layer of diffractive material.

8. The optical device according to claim 1, wherein the control unit includes a memory unit that stores one or more sequences of instructions for successively activating one or more of the micro-LEDs for generating one or more animations visible to an observer.

9. The optical device according to claim 1, wherein the plurality of micro-LEDs have a density per surface unit which is sufficient to create the uniform illumination through the optical module when all of the micro-LEDs are on.

10. A lamp for a motorcar comprising at least one supporting structure to which light sources are connected; and
    wherein the lamp includes at least one optical device according to claim 1.

11. The lamp according to claim 10, wherein the plurality of micro-LEDs are arranged with a density per unit area which is sufficient to create the uniform illumination through the optical module when all of the micro-LEDs are on.

12. An ambient light for a cabin of a motorcar, the ambient light comprising:
    a supporting structure to which a plurality of light sources are connected; and
    at least one optical device according to claim 1.

13. The optical device according to claim 1, wherein said optical module defines a plurality of zones or regions;
    wherein at least one three-dimensional optical effect develops in each zone or region of the plurality of zones or regions; and
    wherein said optical module is configured so that in each zone or region of the plurality of zones or regions, activation of a single micro-LED of the plurality of micro-LEDs will generate a first three-dimensional optical effect; whereas when two or more successive micro-LEDs are activated but less then said predetermined threshold, a second three-dimensional optical effect will be generated, different from the first optical effect.

14. The optical device according to claim 1, wherein said layer of diffractive material is a holographic film or foil comprising, internally and/or on its surfaces, elements configured to create the three-dimensional optical effect, with the three-dimensional optical effect being entirely generated in a same layer of the holographic film or foil.

* * * * *